No. 819,720. PATENTED MAY 8, 1906.
F. BRUNOTTE.
SCREEN FOR SEWAGE OR THE LIKE.
APPLICATION FILED JUNE 24, 1905.
2 SHEETS—SHEET 2.
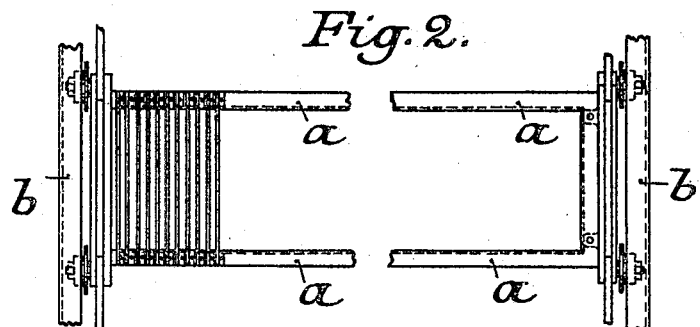
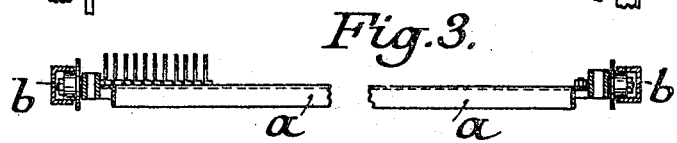
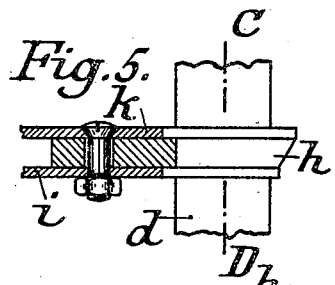
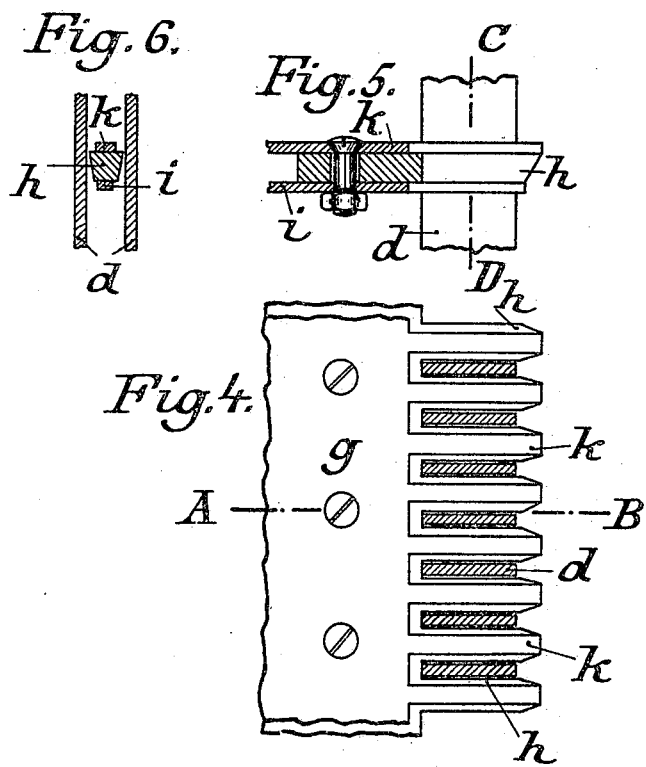
WITNESSES
W. H. Alexander.
Fred C. Henke.
INVENTOR
F. Brunotte
By Fowler & Bryson
ATTORNEYS

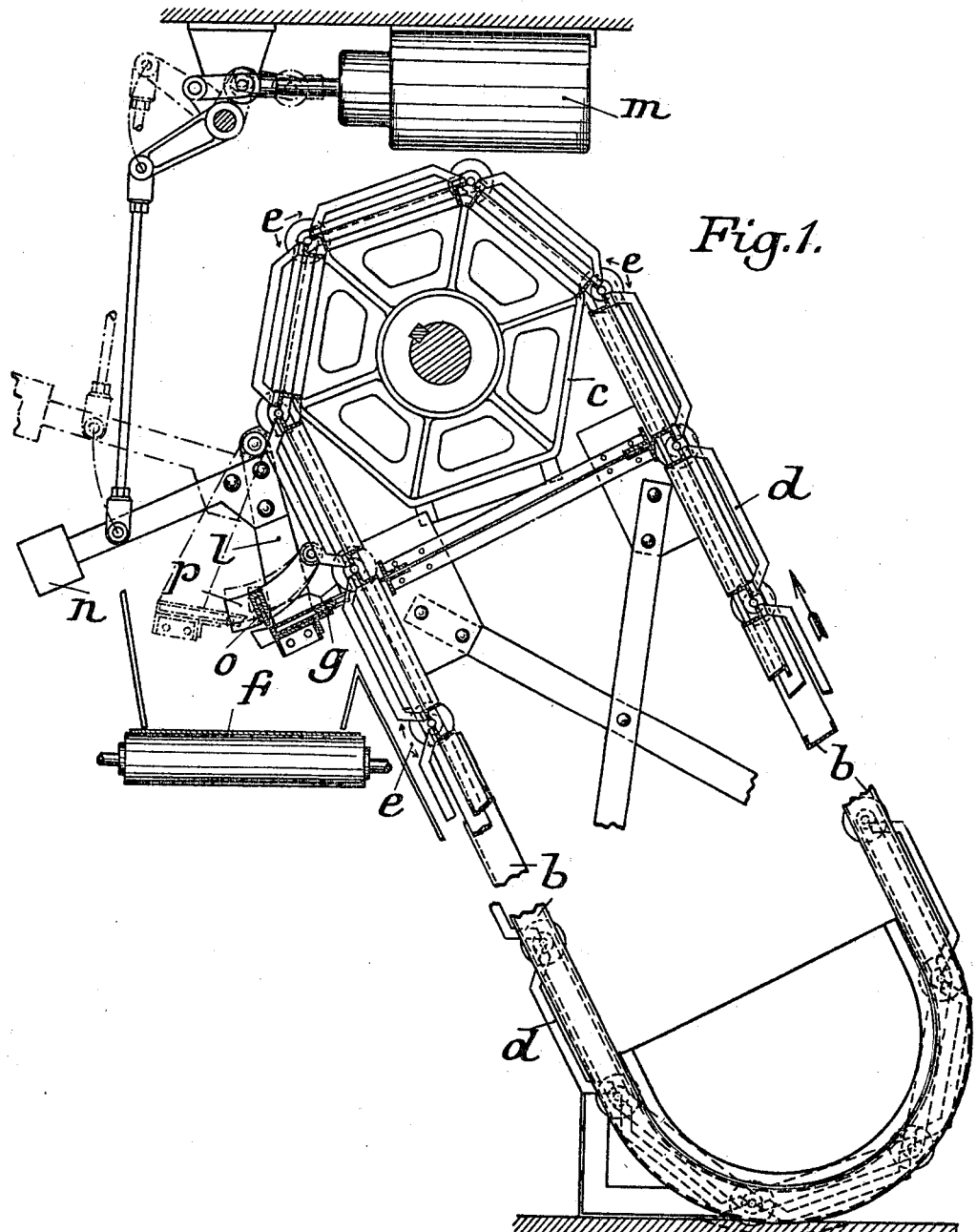

UNITED STATES PATENT OFFICE.

FRIEDRICH BRUNOTTE, OF HAMBURG, GERMANY.

SCREEN FOR SEWAGE OR THE LIKE.

No. 819,720.  Specification of Letters Patent.  Patented May 8, 1906.

Application filed June 24, 1905. Serial No. 266,753.

*To all whom it may concern:*

Be it known that I, FRIEDRICH BRUNOTTE, a subject of the German Emperor, residing at Hamburg, 10 Hammerweg, Germany, have invented certain new and useful Improvements in Screens for Sewage or the Like; and I do hereby declare the following to be a full, clear, and exact description of the invention, such as will enable others skilled in the art to which it appertains to make and use the same.

The present invention relates to a screen for sewage or the like, and is characterized by the fact that separate grating members are connected, so as to form an endless grating running with a continuous or an intermittent movement and discharging the material taken up by it onto a conveyer device. The form of the bars of which the grating is composed is such that the coarser materials settle between each succeeding pair of gratings, in which position they are conveyed upward even when the grating is almost vertical. The finer materials deposited upon the grating are removed by a special scraper and thrown onto the conveyer device.

A constructional form of the apparatus in accordance with this invention is represented in the accompanying drawings, in which—

Figure 1 represents the installation as a whole in side elevation. Fig. 2 is a front elevation of a single grating member. Fig. 3 is a section through the grating member. Fig. 4 is an upper plan view of the scraping device drawn to a larger scale. Fig. 5 is a section on the line A B of Fig. 4, and Fig. 6 is a section on the line C D of Fig. 5.

As shown in Figs. 1, 2, and 3, the grating members consist of frames $a$, connected one with the other in such a manner as to form an endless chain which is carried by means of rollers upon the rails $b$. The endless chain of gratings thus constituted is displaced by means of the drum $c$, which may be driven either continuously or intermittently in any convenient manner.

The bars $d$ of the gratings are formed in such a manner that throughout their entire length they rise out of the plane of the frames $a$, so as to leave between each succeeding pair of gratings free intervals $e$, in the manner of paternoster-work, in which the coarser materials, such as excreta, rats, wood, and the like, which cannot adhere to the bars, may be raised. These materials fall without assistance upon the conveyer-band $f$ as soon as the grating members between which they are lodged have passed the highest point.

In order that the finer materials adhering to the bars of the grating may likewise be caused to fall upon the conveyer-band $f$, a comb $g$ is caused to penetrate between the bars of the grating above the conveyer-band, as shown in Fig. 4. This comb consists of a middle layer $h$ of india-rubber, which rests below upon a plate of sheet-iron $i$ and is covered with a sheet of brass $k$ in such a manner that the india-rubber $h$ protrudes laterally and downward and alone comes into contact with the bars of the grating. Owing to its flat surface, the brass plate $k$ permits of the scraping off of the material collecting upon the comb without shock and protects the india-rubber comb from wear. The iron plate $i$ merely serves to stiffen the device. The said comb is attached to a lever $l$, mounted in such a manner as to be capable of rocking and which each time an interval $e$ between two grating members passes in front of the comb is swung away from the grating by means of a lifting-magnet $m$ or by mechanical means by the intermediary of appropriate connecting-rods in opposition to the action of a counterweight $n$, so that a scraper $o$ passes over the surface of the comb and throws the material that has collected thereon onto the conveyer-band. The scraper $o$ is adapted to lift readily in order to increase the certainty of its action. In the present instance this is attained by fixing the scraper $o$ upon a lever $p$.

The forward-and-rearward movement of the india-rubber comb is effected so speedily and the interval $e$ between two succeeding grating members is calculated in such a manner that the rocking of the comb is able to take place easily during the displacement of the grating through the space $e$ when the conveyer-grating is driven continuously. If the driving is intermittent, the cleaning may be effected while the apparatus is at rest. The construction of the apparatus may also be such that the india-rubber comb is drawn back only after the passage of several grating members.

As compared with stationary gratings the present apparatus presents the advantage that the length of the separate grating-bars may be very short, while in stationary gratings, owing to the great length, the separate bars can only be maintained at the proper uniform interval with great difficulty, as transverse connections between them must be avoided in order that the passage may not be obstructed. It is impossible for the cleaning device in accordance with this invention to become clogged. Further, the material is not broken up in conveying or scraping it off. All parts of the rotating grating are immersed and lifted from the water alternately, and are thus readily accessible for inspection or repair.

Having now particularly described and ascertained the nature of my said invention and in what manner the same is to be performed, I declare that what I claim is—

1. In a screen for sewage or the like, the combination with separate grating members connected one with the other to form an endless chain and extending out of the traveling plane of the chain throughout their entire length, of means for moving said chain of gratings.

2. In a screen for sewage or the like, the combination with separate grating members connected one with the other to form an endless chain having grating-bars extending out of the traveling plane of the chain through their entire length, of means for moving said chain of gratings continuously, and a conveyer-band for carrying away the separated material.

3. In a screen for sewage or the like, the combination with separate grating members connected one with the other to form an endless chain and having grating-bars extending out of the traveling plane of the chain throughout their entire length, of recesses between the succeeding grating members, means for moving said chain of gratings, and a conveyer for carrying away the separated material.

4. In a screen for sewage or the like, the combination with separate grating members connected one with the other to form an endless chain, means for moving said chain of gratings, a cleaning device extending between the grating-bars, and a conveyer for carrying away the separated material.

5. In a screen for sewage or the like, the combination with separate grating members connected one with the other to form an endless chain, of means for moving said chain of gratings, a cleaning-comb penetrating between the grating-bars, and a conveyer for carrying away the separated material.

6. In a screen for sewage or the like, the combination with separate grating members connected one with the other to form an endless chain, of means for moving said chain of gratings, a cleaning-comb extending between the grating-bars, means for rocking said comb, and a conveyer for carrying away the separated material.

7. In a screen for sewage or the like, the combination with separate grating members connected one with the other to form an endless chain, of means for moving said chain of gratings, a cleaning-comb extending between the grating-bars, means for rocking said comb, a scraper, and a conveyer for carrying away the separated material.

8. In a screen for sewage or the like, the combination with separate grating members connected one with the other to form an endless chain, of means for removing said chain of gratings, a cleaning-comb extending between the grating-bars, means for rocking said comb, a pivoted scraper, and a conveyer for carrying away the separated material.

In testimony whereof I have hereunto set my hand and affixed my seal in the presence of the two subscribing witnesses.

FRIEDRICH BRUNOTTE. [L. S.]

Witnesses:
ERNEST H. L. MUMMENHOFF,
IDA CHRIST. HAFERMAMY.